United States Patent
Sasaki et al.

(10) Patent No.: US 8,266,953 B2
(45) Date of Patent: Sep. 18, 2012

(54) METHOD AND APPARATUS FOR DETECTING ABNORMALITY OF NITROGEN OXIDE PURIFYING CATALYST

(75) Inventors: Hisashi Sasaki, Konan (JP); Kenji Kato, Nagoya (JP); Koji Shiotani, Kasugai (JP); Takeshi Kawai, Komaki (JP)

(73) Assignee: NGK Spark Plug Co., Ltd., Aichi (JP)

( * ) Notice: Subject to any disclaimer, the term of this patent is extended or adjusted under 35 U.S.C. 154(b) by 532 days.

(21) Appl. No.: 12/607,106

(22) Filed: Oct. 28, 2009

(65) Prior Publication Data
US 2010/0101314 A1    Apr. 29, 2010

(30) Foreign Application Priority Data
Oct. 29, 2008 (JP) .................................. 2008-278384

(51) Int. Cl.
*G01M 15/04*    (2006.01)
(52) U.S. Cl. .................................................. 73/114.75
(58) Field of Classification Search ............. 73/114.69, 73/114.75
See application file for complete search history.

(56) References Cited

U.S. PATENT DOCUMENTS

| | | | |
|---|---|---|---|
| 5,715,678 A * | 2/1998 | Aronica et al. ................ | 60/276 |
| 6,269,633 B1 * | 8/2001 | van Nieuwstadt et al. ..... | 60/277 |
| 6,309,536 B1 * | 10/2001 | Inagaki et al. ............... | 205/781 |
| 6,797,517 B1 * | 9/2004 | Hoshi et al. .................. | 436/37 |

FOREIGN PATENT DOCUMENTS

JP    11-258194 A    9/1999

* cited by examiner

*Primary Examiner* — Freddie Kirkland, III
(74) *Attorney, Agent, or Firm* — Sughrue Mion, PLLC (57) ABSTRACT

A method and apparatus for detecting an abnormality of a nitrogen oxide purifying catalyst using an NOx sensor, the method including: calculating a detection integrated value by integrating corresponding values corresponding to the NOx sensor output signal obtained until a first predetermined detection period has elapsed after the NOx sensor begins to generate an output signal and subtracting a variation integrated value. The variation integrated value is calculated by integrating corresponding values obtained until a predetermined second detection period has elapsed after the NOx sensor beings to generate an output signal when driven in a gas atmosphere having a constant nitrogen oxide concentration.

8 Claims, 5 Drawing Sheets

METHOD AND APPARATUS FOR DETECTING ABNORMALITY OF NITROGEN OXIDE PURIFYING CATALYST

BACKGROUND OF THE INVENTION

1. Field of the Invention

The present invention relates to a method and device for detecting an abnormality of a nitrogen oxide purifying catalyst used for reducing and purifying nitrogen oxide contained in exhaust gas using a reducing agent, the method and device employing an NOx sensor for detecting nitrogen oxide concentration.

2. Description of the Related Art

In the past, a technology has been known which detects an abnormality of a catalyst (NOx absorbing catalyst) used for accumulating nitrogen oxide contained in exhaust gas discharged from an internal combustion engine such as an automobile engine, and which employs an NOx sensor for detecting nitrogen oxide concentration (NOx) (for example, see Patent Document 1). In recent years, a technology has also been known which purifies and changes a nitrogen oxide into a harmless component by disposing a nitrogen oxide purifying catalyst, used for reducing and purifying the nitrogen oxide contained in exhaust gas using a reducing agent, in a discharge passage of an internal combustion engine.

[Patent Document 1] JP-A-H11-258194

3. Problems to be Solved by the Invention

However, in an NOx sensor (particularly, an NOx sensor including a plurality of cells each having a solid electrolyte and a pair of electrodes), in order to accurately measure nitrogen oxide concentration on the basis of a sensor signal (i.e., a sensor signal corresponding to a value within a target measurement concentration range), a predetermined time must have elapsed after the internal combustion engine is activated and the NOx sensor begins to generate an output signal. Hereinafter, this time is also referred to as a light-off time. The output signal tends to change during the light-off time. That is, in the NOx sensor, there is an unstable period during which the output signal changes independent of the concentration of the nitrogen oxide once the sensor begins to generate an output signal. For this reason, a problem arises in that an abnormality of the nitrogen oxide purifying catalyst cannot be precisely detected using the NOx sensor immediately after the NOx sensor begins to generate an output signal.

SUMMARY OF THE INVENTION

The present invention has been made in consideration of the above-described problems, and an object thereof is to provide a method and device of precisely detecting an abnormality of a nitrogen oxide purifying catalyst even immediately after an NOx sensor begins to generate an output signal.

According to a first aspect (1), the present invention provides a method for detecting an abnormality of nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the method comprising: a detection integrated value calculating step which comprises calculating a detection integrated value by integrating corresponding values corresponding to the NOx sensor output signal obtained until a first predetermined detection period has elapsed after the NOx sensor begins to generate an output signal during activation of the internal combustion engine; and a (first) abnormality detecting step which comprises subtracting a variation integrated value from the detection integrated value calculated in the detection integrated value calculating step and detecting an abnormality of the nitrogen oxide purifying catalyst on the basis of the subtracted value, where the variation integrated value is calculated in advance to represent an amount of variation in the output signal in an unstable period during which the output signal changes independent of the nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration. The "activation" of the internal combustion engine means that the engine is started, the NOx sensor is "driven" means that a detection current is supplied to the sensor.

According to the above first aspect (1), the first detection period is set to be longer than a period of time required until the output of the NOx sensor becomes stable after the NOx sensor begins to generate an output signal.

According to the nitrogen oxide purifying catalyst abnormality detecting method having the above-described configuration (1), even when there is an unstable period during which the output of the NOx sensor becomes unstable after the NOx sensor begins to generate an output signal, an abnormality of the nitrogen oxide purifying catalyst is detected by excluding the influence of the variation integrated value, calculated in advance to represent an amount of variation in the output signal in the unstable period, from the detection integrated value. For this reason, it is possible to precisely detect an abnormality of the nitrogen oxide purifying catalyst immediately after the NOx sensor begins to generate an output signal without having to wait until the output of the NOx sensor becomes stable.

In addition, as a method of detecting an abnormality of the nitrogen oxide purifying catalyst on the basis of the subtracted value, for example, a method may be employed which compares the subtracted value with an abnormality detecting threshold value as a reference for detecting an abnormality of the nitrogen oxide purifying catalyst. For another example, a method may be employed which compares a purification rate, which is calculated on the basis of the subtracted value and the first detecting period, with an abnormality detecting threshold value as a reference for detecting an abnormality of the nitrogen oxide purifying catalyst.

Further, according to a second aspect (2), the present invention provides a method for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine and reducing nitrogen oxide using a reducing agent during activation of the internal combustion engine, the method comprising: a detection integrated value calculating step of calculating a detection integrated value by integrating corresponding values corresponding to the NOx sensor output signal obtained until a first predetermined detection period has elapsed after the NOx sensor begins to generate an output signal during activation of the internal combustion engine; a threshold value correcting step which comprises correcting an abnormality detecting threshold value as a reference for detecting an abnormality of the nitrogen oxide purifying catalyst on the basis of a variation integrated value, where the variation integrated value is calculated in advance to represent an amount of variation in the output signal in an unstable period during which the output signal changes independent of nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration; and a (second) abnormality detecting step which comprises detecting an abnormality of the nitrogen oxide purifying catalyst on the basis of the detection integrated value calculated in the detection integrated value calculating step and the abnormality detecting threshold value corrected in the threshold value correcting step.

According to the above second aspect (2), even when there is an unstable period during which the output of the NOx sensor becomes unstable after NOx sensor begins to generate an output signal, since an abnormality detecting threshold value as a reference for detecting an abnormality of the nitrogen oxide purifying catalyst is corrected on the basis of the variation integrated value calculated in advance to represent an amount of variation in the output signal in the unstable period, it is possible to detect an abnormality of the nitrogen oxide purifying catalyst. For this reason, an abnormality of the nitrogen oxide purifying catalyst can be precisely detected immediately after the NOx sensor begins to generate an output signal.

Further, in both aspects (1) and (2), "the values corresponding to the NOx sensor output signal" may be values of analog signals output from the NOx sensor, digital values converted from the analog signals, or the conversion values of nitrogen oxide concentration based on the values.

However, in both aspects (1) and (2), the variation integrated value calculated in advance is the value obtained by driving the NOx sensor in a gas atmosphere having a constant nitrogen oxide concentration, and may be set to the value according to aspects 3 or 4, discussed below.

In a preferred embodiment (3) of the first and second aspects (1) and (2), the gas atmosphere (in which the concentration of the nitrogen oxide is held constant) is the atmosphere inside the discharge passage during a time at which the internal combustion engine is not running, and the variation integrated value is calculated by driving the NOx sensor in the gas atmosphere. During a time at which the internal combustion engine is not running, the gas discharge operation is not performed by combustion of the internal combustion engine, and the reduction purification operation using a reducing agent is not performed. For this reason, since the concentration of the nitrogen oxide inside the discharge passage does not change or negligibly changes, the NOx sensor is exposed to a gas atmosphere in which the nitrogen oxide concentration is held constant. Likewise, since the variation integrated value is calculated during a time at which the internal combustion engine is not running, even when the output signal of the NOx sensor changes (deteriorates) with long-term usage, it is possible to reflect a variation to the process of detecting an abnormality of the nitrogen oxide purifying catalyst when calculating the variation integrated value after the internal combustion engine stops running.

In a preferred embodiment (4) of the first and second aspects (1) and (2), the variation integrated value is a fixed value which is calculated upon manufacturing the NOx sensor in such manner that the NOx sensor is exposed to the gas atmosphere having a constant nitrogen oxide concentration and driven in the gas atmosphere. That is, the variation integrated value is obtained upon manufacturing of each NOx sensor. Accordingly, it is possible to omit the process of calculating the variation integrated value after attaching the NOx sensor to the discharge passage, and to simplify the nitrogen oxide purifying catalyst abnormality detecting method.

Further, according to a third aspect (5), the present invention provides a nitrogen oxide purifying catalyst abnormality detecting device for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the nitrogen oxide purifying catalyst abnormality detecting device comprising: a detection integrated value calculating unit for calculating a detection integrated value by integrating corresponding values corresponding to the NOx sensor output signal obtained until a first predetermined detection period has elapsed after the NOx sensor begins to generate an output signal during activation of the internal combustion engine; and a (first) abnormality detecting unit for subtracting a variation integrated value from the detection integrated value calculated by the detection integrated value calculating unit and detecting an abnormality of the nitrogen oxide purifying catalyst on the basis of the subtracted value, where the variation integrated value is calculated in advance to represent an amount of variation in the output signal in an unstable period during which the output signal changes independent of the nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration.

The nitrogen oxide purifying catalyst abnormality detecting device having the above-described configuration (5) is a device which embodies the nitrogen oxide purifying catalyst abnormality detecting method according to the first aspect (1). Accordingly, it is possible to obtain the same advantages as the nitrogen oxide purifying catalyst abnormality detecting method according to the first aspect (1).

Further, according to a fourth aspect (6), the present invention provides a nitrogen oxide purifying catalyst abnormality detecting device for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the nitrogen oxide purifying catalyst abnormality detecting device comprising: a detection integrated value calculating unit for calculating a detection integrated value by integrating corresponding values corresponding to the NOx sensor output signal obtained until a first predetermined detection period has elapsed after the NOx sensor begins to generate an output signal during activation of the internal combustion engine; a threshold value correcting unit for correcting an abnormality detecting threshold value as a reference for detecting an abnormality of the nitrogen oxide purifying catalyst on the basis of a variation integrated value, where the variation integrated value is calculated in advance to represent an amount of variation in the output signal in an unstable period during which the output signal changes independent of the nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration; and a (second) abnormality detecting unit for detecting an abnormality of the nitrogen oxide purifying catalyst on the basis of the detection integrated value calculated by the detection integrated value calculating unit and the abnormality detecting threshold value corrected by the threshold value correcting unit.

The nitrogen oxide purifying catalyst abnormality detecting device having the above-described configuration (6) is a device which embodies the nitrogen oxide purifying catalyst abnormality detecting method according to the second aspect (2). Accordingly, it is possible to obtain the same advantages as the nitrogen oxide purifying catalyst abnormality detecting method according to the second aspect (2).

BRIEF DESCRIPTION OF THE DRAWINGS

Illustrative aspects of the invention will be described in detail with reference to the following figures wherein.

DETAILED DESCRIPTION OF THE PREFERRED EMBODIMENTS

The invention will now be described in detail with reference to the drawings. However, the present invention should not be construed as being limited thereto.

(First Embodiment)

Hereinafter, a first embodiment of the invention will be described with reference to the accompanying drawings.

Figure 1:
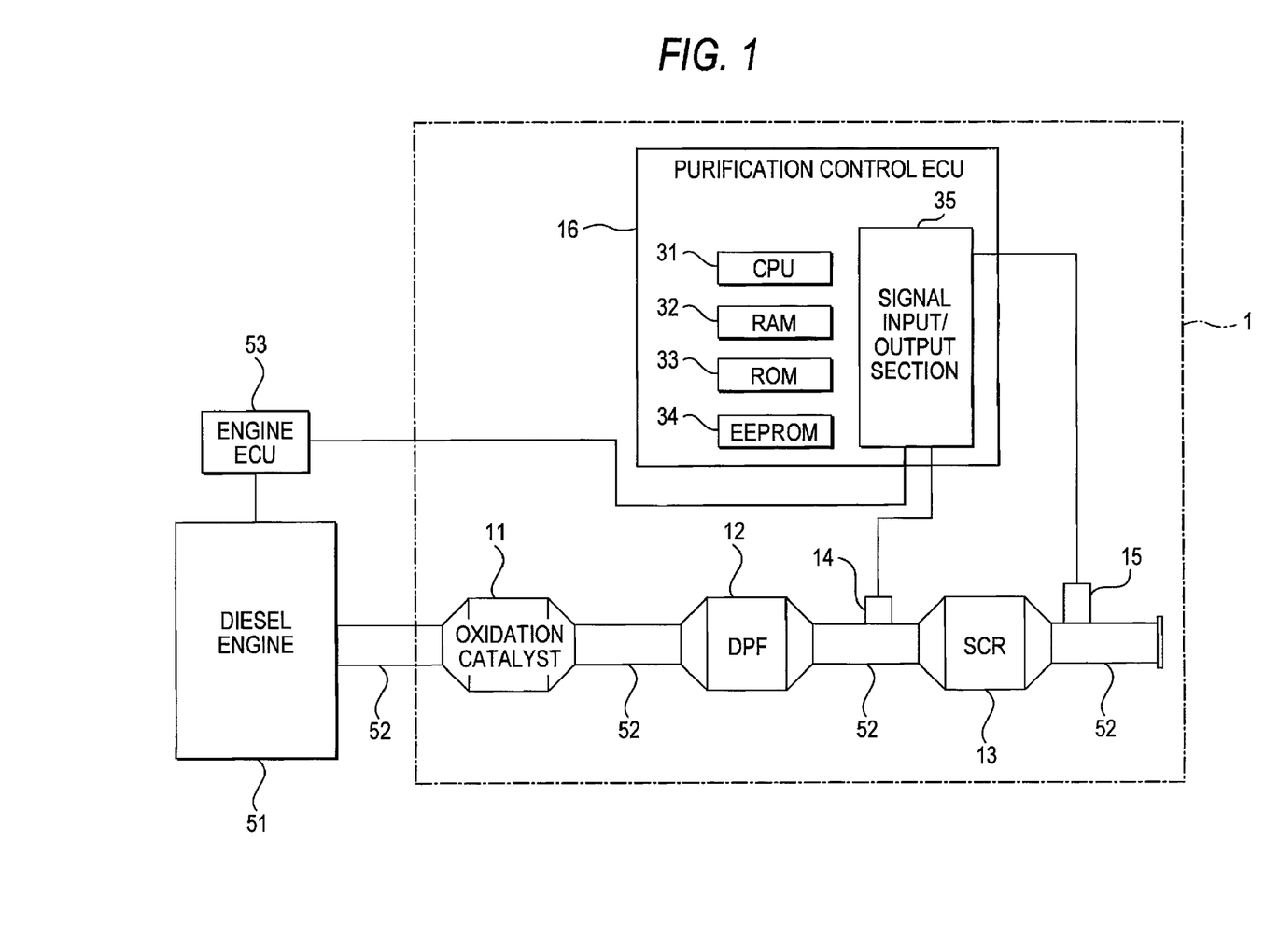
FIG. 1 is a diagram showing a schematic configuration of a urea SCR system 1.

FIG. 1 is a diagram showing a schematic configuration of a urea SCR (Selective Catalytic Reduction) system 1 according to the invention.

As shown in FIG. 1, the urea SCR system 1 includes an oxidation catalyst 11, a DPF (Diesel Particulate Filter) 12, an SCR catalyst 13, a urea water injector 14, an NOx sensor 15, and a purification control ECU 16.

Among these components, the oxidation catalyst 11 receives exhaust gas discharged from a diesel engine 51 through a discharge pipe 52, which is a passage for discharging exhaust gas to the outside, and oxidizes NO in the exhaust gas to $NO_2$. Then, the $NO_2$ is reduced with ammonia to release nitrogen gas and water vapor upon contact with SCR catalyst 13 as described below.

In addition, the DPF 12 receives the exhaust gas discharged from the oxidation catalyst 11 through the discharge pipe 52, and removes particulate material from the exhaust gas.

Further, the SCR catalyst 13 receives exhaust gas discharged from the DPF 12 through the discharge pipe 52, traps NOx contained in the exhaust gas, and catalyzes the reduction of NOx with ammonia into nitrogen gas and water vapor. Accordingly, the SCR catalyst 13 discharges an exhaust gas from which NOx has been removed by chemical reduction.

The urea water injector 14 is disposed in a discharge path between the DPF 12 and the SCR catalyst 13, and injects the urea water into the exhaust gas. The urea water injected into the exhaust gas is hydrolyzed at a high temperature, thereby generating ammonia gas used as a reducing agent for the NOx reduction.

The NOx sensor 15 detects NOx concentration in the exhaust gas discharged from the SCR catalyst 13, and outputs an NOx concentration detection signal indicating the concentration thereof. In addition, as the NOx sensor 15, an NOx sensor including a plurality of cells each having a solid electrolyte and a pair of electrodes may be used. An NOx sensor for use in the invention, including its structure and driving principle, is disclosed in U.S. Pat. No. 6,214,207 B1 (JP-A-H10-142194) and JP-A-H11-304758, incorporated herein by reference.

In addition, the purification control ECU 16 includes a microcomputer having a central processing unit (CPU) 31, a RAM 32, a ROM 33, an EEPROM 34, a signal input/output section 35, and the like. Further, the signal input/output section 35 is connected to an engine ECU 53 which controls the urea water injector 14, the NOx sensor 15 and the diesel engine 51.

The purification control ECU 16 performs a process of controlling a driving state of the urea water injector 14 and the NOx sensor 15, a process of detecting the concentration of NOx contained in the exhaust gas on the basis of the NOx concentration detection signal (output signal) obtained by the NOx sensor 15, a light-off waveform storing process of storing the NOx concentration detection signal after stopping the diesel engine 51, and a starting abnormality determining process of determining an abnormality of the SCR catalyst 13 after starting the diesel engine 51.

Figure 2:
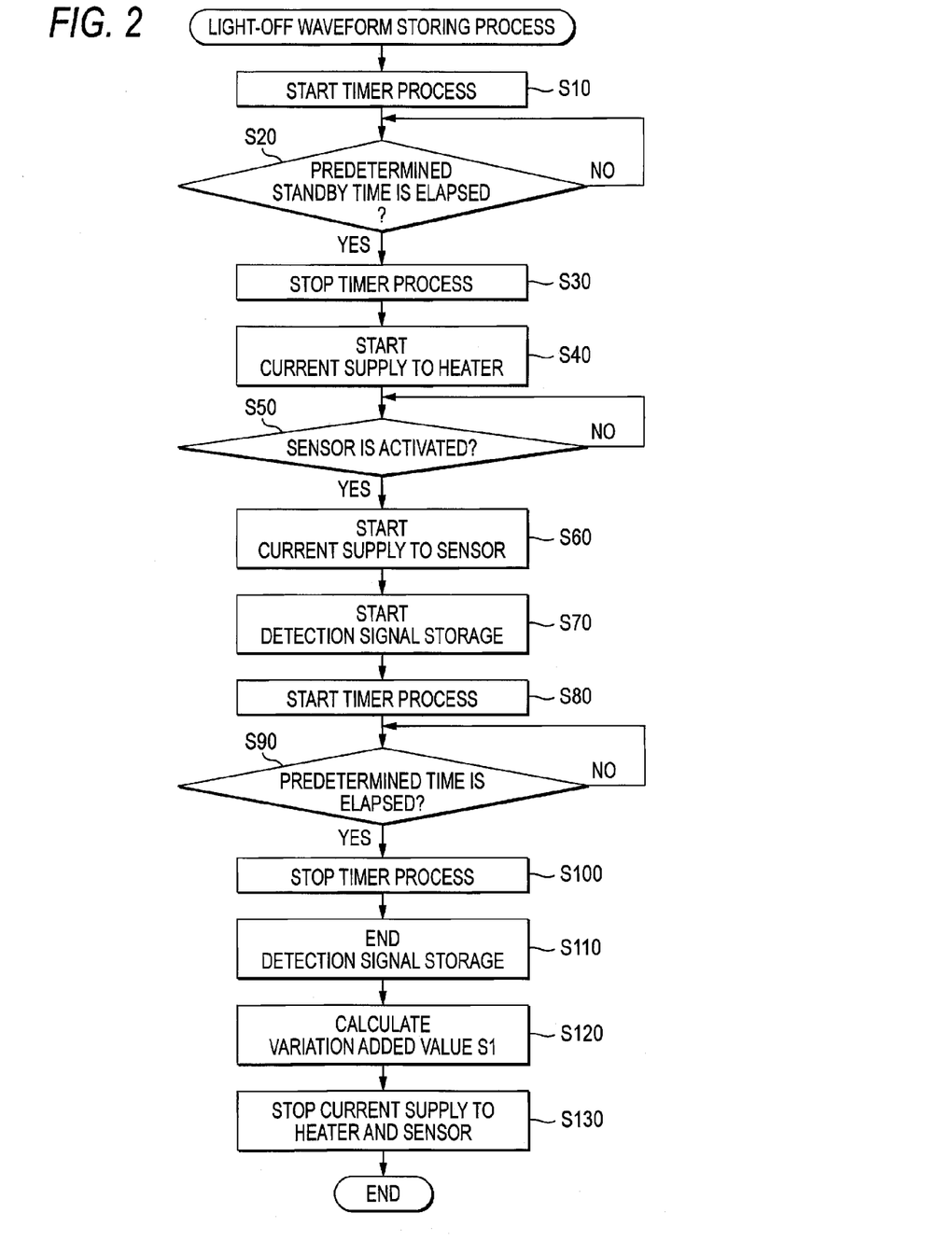
FIG. 2 is a flowchart showing a light-off waveform storing process.

Next, the sequence of the light-off waveform storing process performed by the purification control ECU 16 will be described with reference to FIG. 2. FIG. 2 is a flowchart showing the light-off waveform storing process. The light-off waveform storing process is a process which is performed upon stopping the diesel engine 51.

When the light-off waveform storing process starts, in S10, the purification control ECU 16 first starts a timer process of measuring elapsed time. Subsequently, in S20, a predetermined standby time (for example, 1200 seconds) is counted from a start time point of the time measurement through the timer process. When the predetermined standby time has elapsed (YES in S20), in S30, the timer process of counting the elapsed time stops. In addition, the predetermined standby time is a time at which the temperature of the discharge pipe 52 decreases after stopping the diesel engine 51 and the concentration of nitrogen oxide becomes stable.

In addition, in S40, a current supply to a heater element is commenced which is embedded in the NOx sensor 15 to heat the NOx sensor 15 to an activation temperature. The activation temperature is the temperature at which the output signal can be output in accordance with the concentration of NOx.

Subsequently, in S50, a determination is made as to whether the NOx sensor 15 is activated. In detail, when an element resistance value of a gas sensor element embedded in the NOx sensor 15 is less than a predetermined threshold value, the NOx sensor 15 is activated.

Here, when a determination is made that the NOx sensor 15 is not activated (NO in S50), a standby state is maintained by repeating the process in S50. When a determination is made that the NOx sensor 15 is activated (YES in S50), in S60, a current supply to the gas sensor element is commenced, and the gas sensor begins to generate an output signal.

Subsequently, in S70, a process starts which inputs the NOx concentration detection signal (output signal) obtained by the NOx sensor 15, changes the output signal into a digital value and stores a NOx concentration value (conversion value) indicated by the input NOx concentration detection signal in an EEPROM 34.

Figure 4:
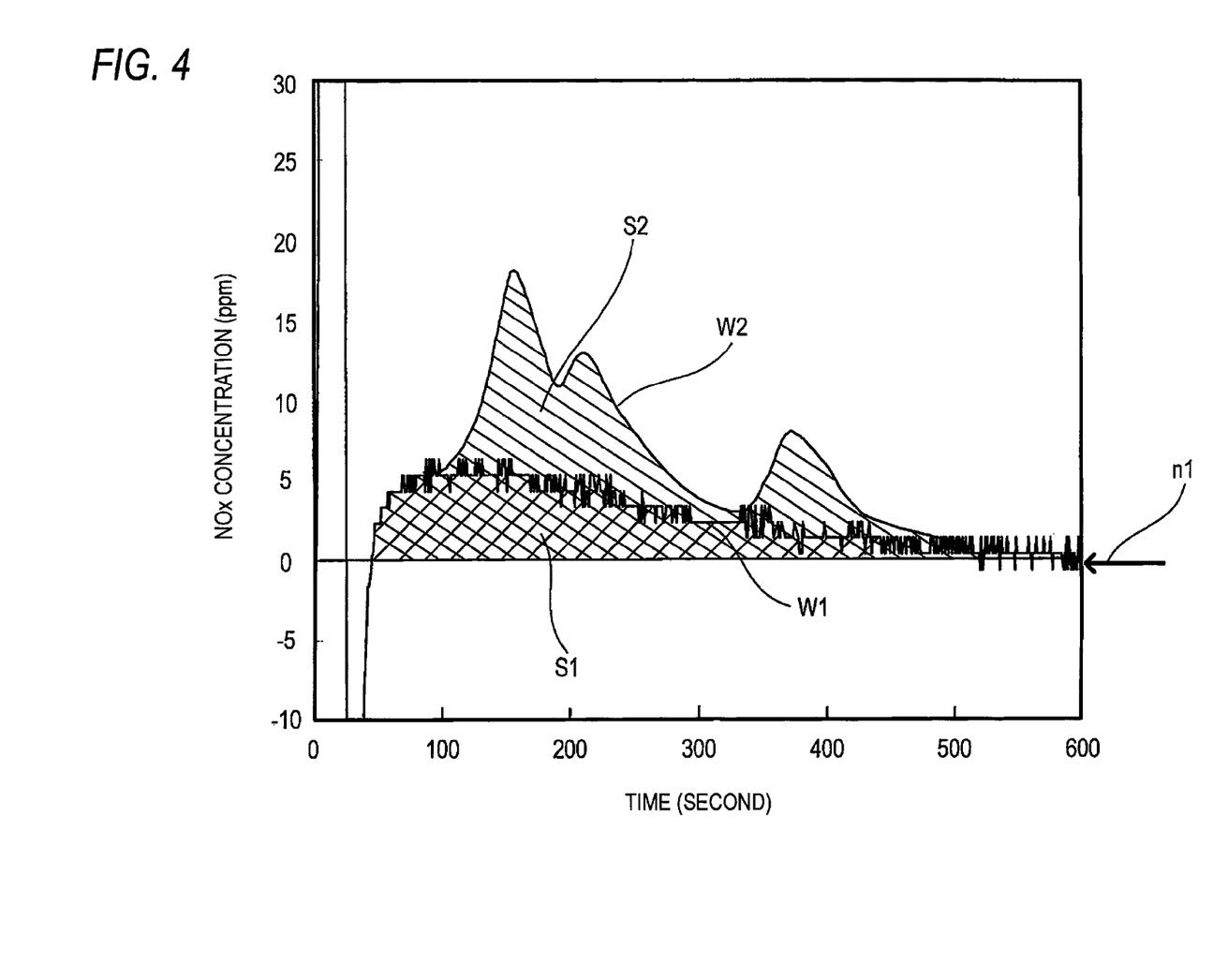
FIG. 4 is a graph showing a light-off waveform W1 and a starting NOx concentration waveform W2.

Further, in S80, a timer process of measuring elapsed time starts. Subsequently, in S90, a predetermined standby time (for example, 600 seconds) is counted from a start time point of the time measurement through the timer process. When the predetermined standby time has elapsed (YES in S90), in S100, the timer process of counting the elapsed time stops. In addition, the process of obtaining and storing the NOx concentration value started in S70 is periodically continued during the elapsed time in S100. Subsequently, in S110, the process of storing the NOx concentration value indicated by the input NOx concentration detection signal in the EEPROM 34 ends. Accordingly, for example, as shown in FIG. 4, it is possible to obtain a waveform W1 (hereinafter, also referred to as a light-off waveform W1) which shows the NOx concentration value until a predetermined detection time has elapsed after stopping the diesel engine 51 and supplying a current to the NOx sensor 15.

Subsequently, in S120, the NOx concentration value (the NOx concentration value at 600 seconds in FIG. 4) after a predetermined detection time has elapsed is set to a value (hereinafter, also referred to as a NOx sensor normal value) when the output of the NOx sensor 15 is normal (see the arrow n1 and 0 ppm in FIG. 4). In addition, on the basis of the NOx sensor normal value, a NOx concentration value integrated value S1 (hereinafter, also referred to as a variation integrated value S1) indicated by the light-off waveform W1 is calculated (see a region S1 hatched by the right upward inclined line in FIG. 4).

Subsequently, in S130, the light-off waveform storing process ends by stopping the current supply to the heater element and the gas sensor element.

Figure 3:
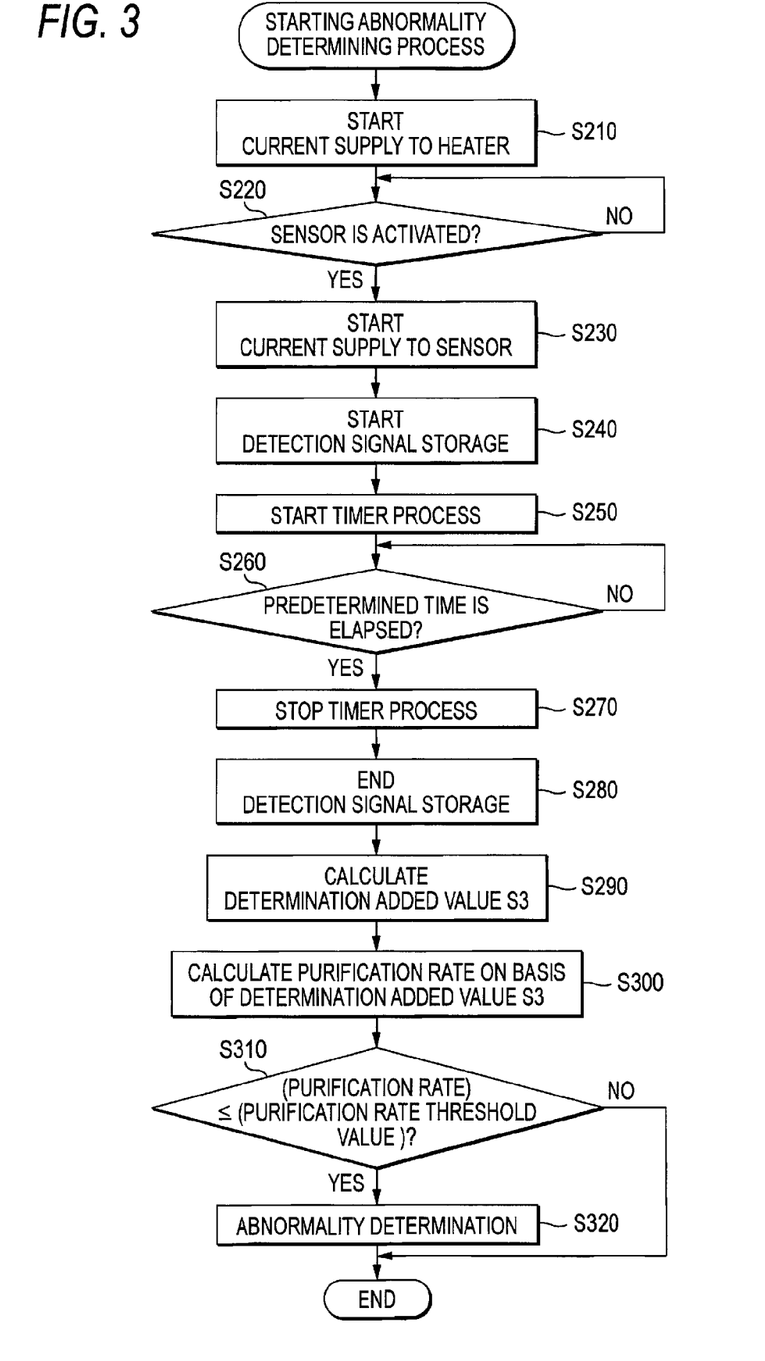
FIG. 3 is a flowchart showing a starting abnormality determining process according to a first embodiment.

Next, the sequence of the start abnormality determining process performed by the purification control ECU 16 will be described with reference to FIG. 3. FIG. 3 is a flowchart showing the start abnormality determining process. The start abnormality determining process is a process which is performed upon starting the diesel engine 51.

When the start abnormality determining process starts, in S210, the purification control ECU 16 first begins to supply a current to the heater element for heating the NOx sensor 15. Subsequently, in S220, a determination is made whether the NOx sensor 15 is activated. Here, when a determination is made that the NOx sensor 15 is not activated (NO in S220), a standby state is maintained by repeating the process in S220. When a determination is made that the NOx sensor 15 is activated (YES in S220), in S230, a current supply is commenced to the gas sensor element (not shown) in the NOx sensor 15, and the gas sensor begins to generate an output signal.

Subsequently, in S240, a process starts which inputs the NOx concentration detection signal obtained by the NOx sensor 15, changes the same into a digital value and stores an NOx concentration value (conversion value) indicated by the input NOx concentration detection signal in the EEPROM 34.

Further, in S250, a timer process of counting an elapsed time starts. Subsequently, in S260, a predetermined standby time (the same time set in S90) elapses from a start time point of the time measurement through the timer process. When the predetermined standby time has elapsed (YES in S260), in S270, the timer process of counting the elapsed time stops. In addition, the process of obtaining and storing the NOx concentration value started in S240 is periodically continued during the elapsed time in S260. Subsequently, in S280, the process of storing the NOx concentration value indicated by the input NOx concentration detection signal in the EEPROM 34 ends. Accordingly, for example, as shown in FIG. 4, it is possible to obtain a waveform W2 (hereinafter, also referred to as a starting NOx concentration waveform W2) which shows the NOx concentration value until a predetermined detection time has elapsed after starting the diesel engine 51 and supplying a current to the NOx sensor 15.

Subsequently, in S290, on the basis of an NOx sensor normal value (see the arrow n1), an NOx concentration value integrated value S2 (hereinafter, referred to as a detection integrated value S2) indicated by the starting NOx concentration waveform W2 is calculated (see a region S2 hatched by the left upward inclined lines in FIG. 4). The variation integrated value S1 calculated in S120 is subtracted from the detection integrated value S2, and the subtracted value is set to a determination integrated value S3.

In S300, on the basis of the determination integrated value S3 calculated in S290, a purification rate is calculated which represents a degree to which NOx is purified by the reduction reaction of the SCR catalyst 13.

Subsequently, in S310, a determination is made as to whether the purification rate calculated in S300 is not more than a predetermined purification rate threshold value so as to determine whether the SCR catalyst 13 is abnormal. Here, when the purification rate is not more than the purification rate threshold value (YES in S310), in S320, a determination is made that the SCR catalyst 13 is abnormal, and the starting abnormality determining process ends. On the other hand, when the purification rate exceeds the purification rate threshold value (NO in S310), the starting abnormality determining process ends.

In the urea SCR system 1 having the above-described configuration, first, the variation integrated value S1 obtained by integrating the NOx concentration value indicated by the NOx detection signal output from the NOx sensor 15 is calculated within a predetermined detection time after stopping the diesel engine 51 (S70 to S120). Subsequently, the detection integrated value S2 obtained by integrating the NOx concentration value indicated by the NOx concentration detection signal output from the NOx sensor 15 is calculated within a predetermined detection time after starting the diesel engine 51 (S240 to S290). Subsequently, the determination integrated value S3 is calculated by subtracting the variation integrated value S1 from the detection integrated value S2 (S290), and the purification rate is calculated on the basis of the determination integrated value S3 (S300). Subsequently, a determination is made that the SCR catalyst 13 is abnormal if the purification rate is not more than the purification rate threshold value (S310 to S320).

According to the urea SCR system 1 having the above-described configuration, since the output of the NOx sensor 15 is unstable just after the NOx sensor 15 begins to generate an output signal, it is possible to perform the process of detecting an abnormality of the SCR catalyst 13 by excluding the influence of the variation integrated value S1 even when the variation integrated value S1 is included in the detection integrated value S2. For this reason, it is possible to precisely perform the process of detecting an abnormality of the SCR catalyst 13 immediately after the NOx sensor 15 begins to generate an output signal without having to wait until the output of the NOx sensor 15 becomes stable.

In the above-described embodiment, the purification control ECU 16 and the NOx sensor 15 correspond to the abnormality detecting device of the invention. The SCR catalyst 13 corresponds to the nitrogen oxide purifying catalyst of the invention. The processes in S240 to S290 correspond to the detection integrated value calculating unit and the detection integrated value calculating sequence of the invention. The processes in S290 to S320 correspond to the first abnormality detecting unit and the first abnormality detecting sequence of the invention. The predetermined detection time in S260 corresponds to the first detection period of the invention. The predetermined detection time in S90 corresponds to the second detection period of the invention.

(Second Embodiment)

Hereinafter, a second embodiment of the invention will be described with reference to the accompanying drawings. In the second embodiment, those parts differing from the first embodiment will be described.

The urea SCR system 1 of the second embodiment is the same as that of the first embodiment, except that the starting abnormality determining process is changed.

Figure 5:
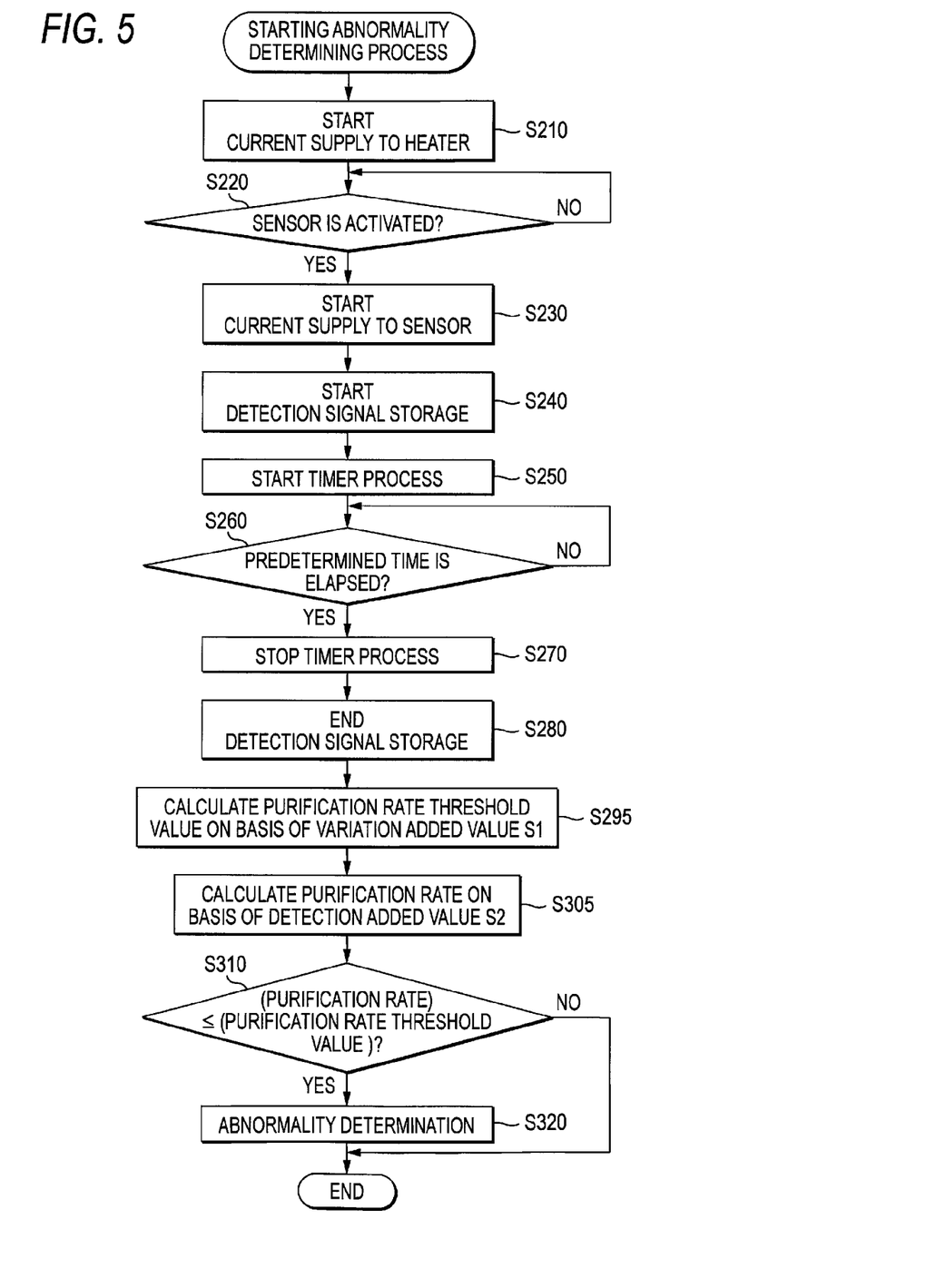
FIG. 5 is a flowchart showing a starting abnormality determining process according to a second embodiment.

Next, the sequence of the starting abnormality determining process according to the second embodiment will be described with reference to the flowchart of FIG. 5.

The starting abnormality determining process of the second embodiments is the same as that of the first embodiment except that the processes in S290 and S300 are omitted and the processes in S295 and S305 are added.

That is, when the process in S280 ends, in S295, the purification rate corresponding to the variation integrated value S1 calculated in S120 is calculated. The purification rate is added to a reference purification rate threshold value set in advance as a reference for detecting an abnormality of the nitrogen oxide purifying catalyst, so that the integrated value is set to a purification rate threshold value.

Subsequently, when the process in S295 ends, in S305, on the basis of the NOx sensor normal value (see the arrow n1 in FIG. 4), the NOx concentration value integrated value S2 (detection integrated value S2) indicated by the starting NOx concentration waveform W2 is calculated. On the basis of the detection integrated value S2, the purification rate is calculated, and the process in S310 starts.

In the urea SCR system 1 with the above-described configuration, the purification threshold value is corrected on the basis of the variation integrated value S1 (S295). In addition, the detection integrated value S2 is calculated by integrating the NOx concentration value indicated by the NOx concentration redetection signal output from the NOx sensor 15 within a predetermined detection time after starting the diesel engine 51, and the purification rate is calculated on the basis of the detection integrated value S2 (S240 to S280 and S305). Subsequently, the SCR catalyst 13 is determined to be abnormal if the purification rate is not more than the purification rate threshold value (S310 to S320).

According to the urea SCR system 1 having the above-described configuration, since the output of the NOx sensor 15 is unstable just after the NOx sensor 15 begins to generate an output signal, the purification threshold value is corrected on the basis of the variation integrated value S1 even when the variation integrated value S1 is included in the detection integrated value S2. Accordingly, the process of detecting the abnormality of the SCR catalyst 13 may be performed by excluding the influence of the variation integrated value S1. For this reason, it is possible to precisely perform the process of detecting the abnormality of the SCR catalyst 13 immediately after the NOx sensor 15 begins to generate an output signal without having to wait until the output of the NOx sensor 15 becomes stable.

In the above-described embodiment, the process in S295 corresponds to the threshold value correcting unit and the threshold value correcting sequence of the invention. The processes in S310 to S320 correspond to the second abnormality detecting unit and the second abnormality detecting sequence of the invention. The purification threshold value corresponds to the abnormality detecting threshold value of the invention.

Although exemplary embodiments of the invention are described above, the present invention is not limited thereto, and may adopt various forms within the spirit and scope of the claims appended hereto.

For example, in the above-described embodiments, the variation integrated value S1 is calculated after stopping the diesel engine 51. However, a fixed value calculated in advance may be set as the variation integrated value S1, and may be stored in, for example, the ROM 33 or the EEPROM 34 of the purification control ECU 16. In addition, the variation integrated value S1 as the fixed value may be obtained upon manufacturing the NOx sensor 15 by exposing the NOx sensor 15 to a gas atmosphere in which the concentration of the nitrogen oxide is held constant, driving the NOx sensor 15 under this gas atmosphere, and then obtaining the NOx concentration value (conversion value) until a predetermined detection period (in the case of the above-described embodiment, 600 seconds) after the sensor begins to generate an output signal. Accordingly, it is possible to omit the process of calculating the variation integrated value S1, to thereby simplify the abnormality detection process of the SCR catalyst 13.

It should further be apparent to those skilled in the art that various changes in form and detail of the invention as shown and described above may be made. It is intended that such changes be included within the spirit and scope of the claims appended hereto.

This application claims priority from Japanese Patent Application No. 2008-278384, which was filed on Oct. 29, 2008, the disclosure of which is incorporated herein by reference in its entirety.

What is claimed is:

1. A method for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the method comprising:

a detection integrated value calculating step which comprises calculating a detection integrated value by integrating corresponding values corresponding to the NOx sensor output signal obtained until a first predetermined detection period has elapsed after the NOx sensor begins to generate an output signal during activation of the internal combustion engine; and an abnormality detecting step which comprises subtracting a variation integrated value from the detection integrated value calculated in the detection integrated value calculating step and detecting an abnormality of the nitrogen oxide purifying catalyst on the basis of the subtracted value, where the variation integrated value is calculated in advance to represent an amount of variation in the output signal in an unstable period during which the output signal changes independent of nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration.

2. The method for detecting an abnormality of nitrogen oxide purifying catalyst according to claim 1,
wherein
the gas atmosphere is an atmosphere inside the discharge passage during a time at which the internal combustion engine is not running, and
wherein
the variation integrated value is calculated by driving the NOx sensor in the gas atmosphere having a constant nitrogen oxide concentration.

3. The method for detecting an abnormality of nitrogen oxide purifying catalyst according to claim 1,
wherein
the variation integrated value is a fixed value which is calculated upon manufacturing the NOx sensor in such manner that the NOx sensor is exposed to the gas atmosphere having a constant nitrogen oxide concentration and driven in the gas atmosphere.

4. A method for detecting an abnormality of a nitrogen oxide purifying catalyst using a NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the method comprising:
 a detection integrated value calculating step which comprises calculating a detection integrated value by integrating corresponding values corresponding to the NOx sensor output signal obtained until a first predetermined detection period has elapsed after the NOx sensor begins to generate an output signal during activation of the internal combustion engine;
 a threshold value correcting step which comprises correcting an abnormality detecting threshold value as a reference for detecting an abnormality of the nitrogen oxide purifying catalyst on the basis of a variation integrated value, where the variation integrated value is calculated in advance to represent an amount of variation in the output signal in an unstable period during which the output signal changes independent of nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration; and
 an abnormality detecting step which comprises detecting an abnormality of the nitrogen oxide purifying catalyst on the basis of the detection integrated value calculated in the detection integrated value calculating step and the abnormality detecting threshold value corrected in the threshold value correcting step.

5. The method for detecting an abnormality of nitrogen oxide purifying catalyst according to claim 4,
wherein
the gas atmosphere is an atmosphere inside the discharge passage during a time at which the internal combustion engine is not running, and
wherein
the variation integrated value is calculated by driving the NOx sensor in the gas atmosphere having a constant nitrogen oxide concentration.

6. The method for detecting an abnormality of nitrogen oxide purifying catalyst according to claim 4,
wherein
the variation integrated value is a fixed value which is calculated upon manufacturing the NOx sensor in such manner that the NOx sensor is exposed to the gas atmosphere having a constant nitrogen oxide concentration and driven in the gas atmosphere.

7. A nitrogen oxide purifying catalyst abnormality detecting device for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the nitrogen oxide purifying catalyst abnormality detecting device comprising:
 a detection integrated value calculating unit for calculating a detection integrated value by integrating corresponding values corresponding to the NOx sensor output signal obtained until a first predetermined detection period has elapsed after the NOx sensor begins to generate an output signal during activation of the internal combustion engine; and
 an abnormality detecting unit for subtracting a variation integrated value from the detection integrated value calculated by the detection integrated value calculating unit and detecting an abnormality of the nitrogen oxide purifying catalyst on the basis of the subtracted value, where the variation integrated value is calculated in advance to represent an amount of variation in the output signal in an unstable period during which the output signal changes independent of nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration.

8. A nitrogen oxide purifying catalyst abnormality detecting device for detecting an abnormality of a nitrogen oxide purifying catalyst using an NOx sensor for outputting an output signal in accordance with nitrogen oxide concentration, the nitrogen oxide purifying catalyst being disposed in a discharge passage of an internal combustion engine discharging an exhaust gas and reducing nitrogen oxide contained in the exhaust gas using a reducing agent during activation of the internal combustion engine, the nitrogen oxide purifying catalyst abnormality detecting device comprising:
 a detection integrated value calculating unit for calculating a detection integrated value by integrating corresponding values corresponding to the NOx sensor output signal obtained until a first predetermined detection period has elapsed after the NOx sensor begins to generate an output signal during activation of the internal combustion engine;
 a threshold value correcting unit for correcting an abnormality detecting threshold value as a reference for detecting an abnormality of the nitrogen oxide purifying catalyst on the basis of a variation integrated value, where the variation integrated value is calculated in advance to represent an amount of variation in the output signal in an unstable period during which the output signal changes independent of nitrogen oxide concentration after the NOx sensor begins to generate an output signal, and the variation integrated value is calculated by integrating corresponding values obtained until a predetermined second detection period set to be the same as the first detection period has elapsed after the NOx sensor begins to generate an output signal when driven in a gas atmosphere having a constant nitrogen oxide concentration; and an abnormality detecting unit for detecting an abnormality of the nitrogen oxide purifying catalyst on the basis of the detection integrated value calculated by the detection integrated value calculating unit and the abnormality detecting threshold value corrected by the threshold value correcting unit.

* * * * *